United States Patent
Chang

(10) Patent No.: US 7,482,799 B2
(45) Date of Patent: Jan. 27, 2009

(54) HIGH-VOLTAGE DETECTING CIRCUIT FOR SAVING POWER IN STANDBY MODE

(75) Inventor: Shih-Hsien Chang, Zhongli (TW)

(73) Assignee: Delta Electronics, Inc. (TW)

( * ) Notice: Subject to any disclaimer, the term of this patent is extended or adjusted under 35 U.S.C. 154(b) by 497 days.

(21) Appl. No.: 11/345,733

(22) Filed: Feb. 2, 2006

(65) Prior Publication Data

US 2007/0081370 A1   Apr. 12, 2007

(30) Foreign Application Priority Data

Sep. 23, 2005   (TW) .............................. 94133251 A

(51) Int. Cl.
*G01R 19/14* (2006.01)
*H02H 3/20* (2006.01)

(52) U.S. Cl. ...................... 324/133; 361/91.5
(58) Field of Classification Search ................. 324/133, 324/76.11, 72.5; 348/730; 361/91.5
See application file for complete search history.

(56) References Cited

U.S. PATENT DOCUMENTS

| | | | | |
|---|---|---|---|---|
| 3,721,858 A | * | 3/1973 | Shimizu | 315/383 |
| 3,745,246 A | * | 7/1973 | Kashiwagi | 348/730 |
| 3,818,353 A | * | 6/1974 | Sakamoto | 455/167.1 |
| 4,649,465 A | * | 3/1987 | Kitou et al. | 363/21.12 |
| 4,829,414 A | * | 5/1989 | Yook | 363/20 |

* cited by examiner

*Primary Examiner*—Shawn Riley
(74) *Attorney, Agent, or Firm*—Allen, Dyer, Doppelt, Milbrath & Gilchrist, P.A.

(57) ABSTRACT

A high-voltage detecting circuit for saving power in a standby mode is provided. The high-voltage detecting circuit includes a high-voltage detecting module, a switch module and a control module. The high-voltage detecting module is composed of several resistors for detecting a high-voltage power supply. A control terminal of the control module is controlled by the power supply to switch off the switch module when the power supply stays at the standby mode, ensuring that the power loss of the high-voltage detecting module is eliminated.

21 Claims, 3 Drawing Sheets

HIGH-VOLTAGE DETECTING CIRCUIT FOR SAVING POWER IN STANDBY MODE

FIELD OF THE INVENTION

The present invention relates to a high-voltage detecting circuit for detecting a high-voltage power supply, and more particularly to a high-voltage detecting circuit for saving power in a standby mode.

BACKGROUND OF THE INVENTION

By and large, a power supply utilizes an AC/DC converter to receive the commercial AC power and transforms the AC power to a DC power with a high-voltage level. Subsequently, a DC/DC converter is used to convert the DC power with a high-voltage level into a DC power with a low-voltage level for operating an electronic device, for example a desktop computer or a notebook computer.

Part of the circuit layout of the conventional power supply is as shown in FIG. 1. In FIG. 1 the power supply 10 is composed of a main circuit 11, a discharge circuit 12 and a high-voltage detecting circuit 13. The main circuit 11 contains a PFC IC 111. The high-voltage detecting circuit 13 functions to detect a high-voltage power supply and provides the feedback, protecting or detecting function to various ICs of the main circuit 32 to ensure that the power supply 10 performs a normal AC/DC conversion function during operation. Usually, the high-voltage detecting circuit 13 is constituted by a plurality of serially-connected resistors. What's worth mentioning is that the resistor layout of the high-voltage detecting circuit 13 will become more complicated if ICs with different functions are added to the position at which the PFC IC 111 is located. However, those resistors can be treated as a whole, e.g. the high-voltage detecting circuit 13.

Besides, when the power supply 10 stays in a standby mode, with an exception of an IC responsible for powering off the system operation (not shown), all ICs including the PFC IC 111 are shut off to save the power during the standby mode. Whereas, the high-voltage detecting circuit 13 purely constituted by the resistors is used to detect a high-voltage power supply, meaning that it will consume considerable power during the standby mode. Such drawback fails to meet the eager call in the commercial market attempting to lower the standby power loss of the electronic device.

A clear understanding is attainable by using actual values to carry out an estimation. Assume that the total resistance value is 1.2 MΩ for all resistors in the discharge circuit 12 and 1.5 MΩ for all resistors in the high-voltage detecting circuit 13, and the standby power loss of the IC in the main circuit 11 used to switch off the system is 70 mW:

(1) When the input terminal of the power supply 10 receives an 240V AC power, given the power equation relevant to resistor, $P=V^2/R$, and the AC/DC conversion factor approximately equivalent to 1.4, the following calculations can be obtained:

the standby power loss of the discharge circuit 12 is:

$240^2(V)/1.2(M\Omega)=48(mW)$;

the standby power loss of the high-voltage detecting circuit 13 is:

$(240\times1.4)^2(V)/1.5(M\Omega)=75(mW)$; and as such, the standby power loss of the power supply 10 is:

$48(mW)+75(mW)+70(mW)=0.193(W)$.

(2) When the input terminal of the power supply 10 receives an 100V AC power, given the power equation relevant to resistor, $P=V^2/R$, and the AC/DC conversion factor approximately equivalent to 1.4, the following calculations can be obtained:

the standby power loss of the discharge circuit 12 is:

$100^2(V)/1.2(M\Omega)=8.3(mW)$;

the standby power loss of the high-voltage detecting circuit 13 is:

$(100\times1.4)^2(V)/1.5(M\Omega)=13(mW)$; and

As such, the standby power loss of the power supply 10 is:

$8.3(mW)+13(mW)+70(mW)=0.091(W)$.

Currently, the standards in the commercial market demanding to lower the standby power loss of the electronic device tend to be strict, particularly in Japan, and the standby power loss shall be lower than 0.2 W for input AC power of 240V and lower than 0.1 W for input AC power of 100V respectively. As the aforementioned calculation result stands, the high-voltage detecting circuit 13 in the conventional power supply 10 as shown in FIG. 1 is the major reason that the prior art fails to lower the standby power loss.

To tackle the shortcoming of the power supply 10 as shown in FIG. 1, another solution of the prior art was brought up as shown in FIG. 2. Similarly, the power supply 20 is also composed of a main circuit 21, a discharge circuit 22 and a high-voltage detecting circuit 23, wherein the main circuit 21 includes a PFC IC 211. However, in comparison with FIG. 1, the input terminal of the discharge circuit 22 is connected with a relay 24 additionally. By means of the control of the relay 24 at the standby state, the standby power loss of the discharge circuit 22 and the high-voltage detecting circuit 23 in the power supply 20 can be entirely eliminated. As a result, the standby power loss is only 70 mW, which is the standby power loss of the IC in the main circuit 21 for powering off the system.

Although the power supply 20 in FIG. 2 has improved the disadvantage of the power supply 10 in FIG. 1, it still leads to the following drawbacks:

(1) The cost of the relay, which is relatively higher than that of the resistor, transistor switch, etc., impacts on the cost-down planning of the manufacturer.

(2) The reliability of the relay is an issue; in other words, while the total operation time thereof accumulates, the circuit joint thereof will have an aging effect, thereby deteriorating the system performance.

For overcoming the drawbacks of the prior art, the present invention provides a novel high-voltage detection circuit for saving power at the standby mode, which brings about an improved design of the high-voltage detecting circuit.

SUMMARY OF THE INVENTION

The conception of the present invention utilizes the command of the PFC IC in the power supply to control the conduction of the high-voltage detecting circuit so as to eliminate the power loss of the high-voltage detecting module when the power supply stays at the standby mode.

In accordance with an aspect of the present invention, a high-voltage detecting circuit is provided. The provided high-voltage detecting circuit contains a high-voltage detecting module, a switch module and a control module, wherein the high-voltage detecting module is composed of a plurality of resistors for detecting a high-voltage power supply, the control terminal of the control module is controlled by the power supply to shut down the switch module at the standby mode so as to eliminate the standby power loss of the high-voltage detecting module.

The foregoing and other features and advantages of the present invention will be more clearly understood through the following descriptions with reference to the drawing, wherein:

DETAILED DESCRIPTION OF THE PREFERRED EMBODIMENT

Figure 3:
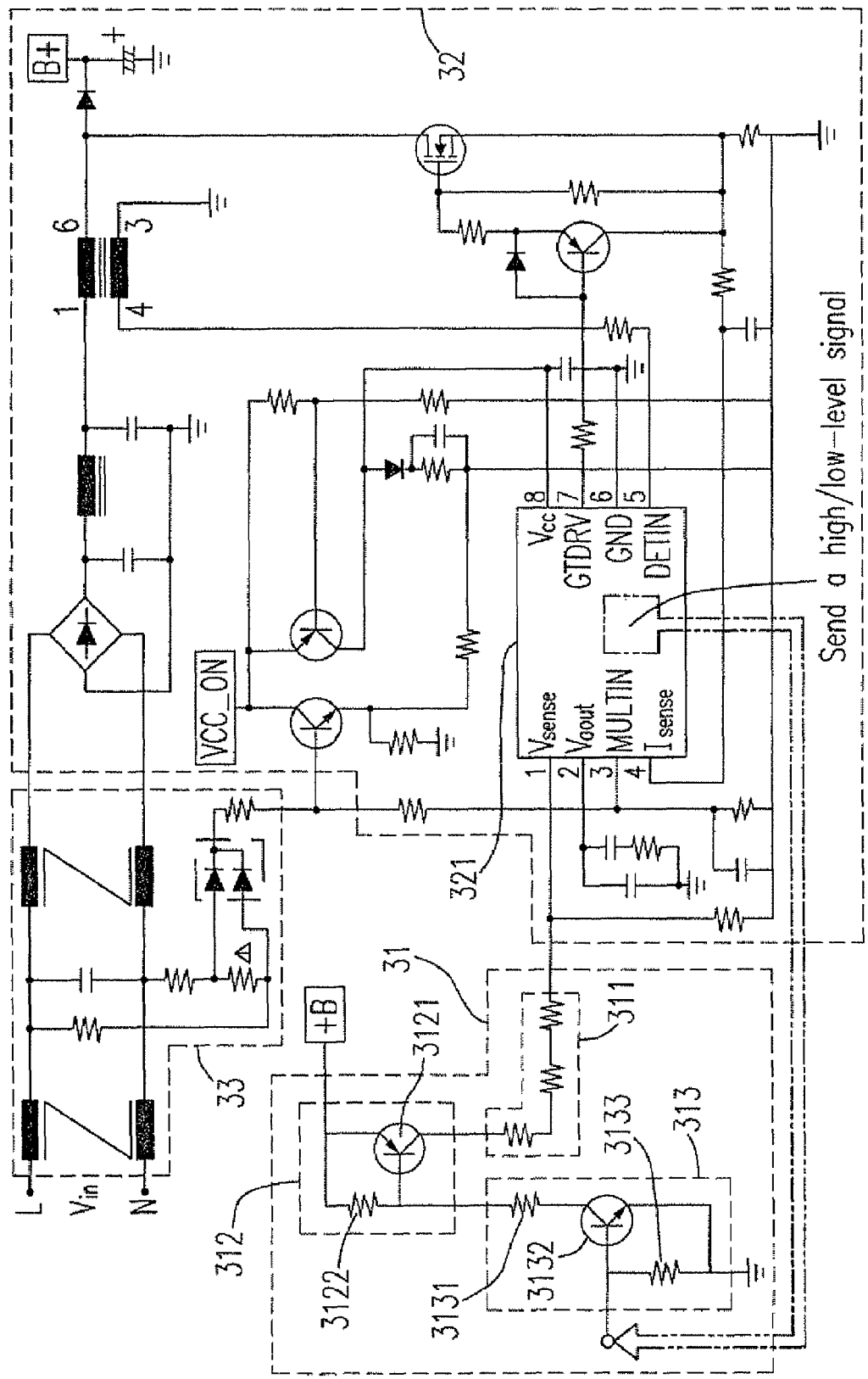
FIG. 3 is a schematic view showing the high-voltage detecting circuit and a partial circuit configuration of the power supply using the high-voltage detecting circuit according to a preferred embodiment of the present invention.

Please refer to FIG. 3, which is a schematic view showing the high-voltage detecting circuit and a partial circuit configuration of the power supply using the high-voltage detecting circuit according to a preferred embodiment of the present invention.

The power supply 30 in FIG. 3 is used to receive a AC power, convert the AC power into a first DC power with a high-voltage level and further transform the first DC power into a second DC power having a low-voltage level. The power supply 30 includes a main circuit 32 and a discharge circuit 33. Similarly, the main circuit 32 contains a PFC IC 321.

The present invention is characterized by providing a high-voltage detecting circuit 31 in connection with the high-voltage detecting terminal of the main circuit 32. The high-voltage detecting circuit 31 is composed of a high-voltage detecting module 311, a switch module 312 and a control module 313.

The high-voltage detecting module 311 functions to detect a high-voltage power supply and provides the feedback, protecting or detecting function to various ICs of the main circuit 32 to ensure that the power supply 30 performs a normal AC/DC conversion function during operation. Usually, the high-voltage detecting circuit 31 is constituted by a plurality of serially-connected resistors. There are other Ics having different functions added to the position at which the PFC IC 321 in the preferred embodiment is located. This simply winds out with a more complicated resistor layout for the high-voltage detecting module 311 rather than three serially-connected resistors as shown in FIG. 3. However, those resistors can be treated as a whole, i.e. the high-voltage detecting module 311.

The switch module 312 in the preferred embodiment of the present invention is composed of a first switch 3121 and a first resistor 3122. The first terminal of the first switch 3121 is electrically connected with a power supply, and the second terminal thereof is electrically connected with the high-voltage detecting module 311. One terminal of the first resistor 3122 is electrically connected with the power supply, and the other terminal is electrically connected with the control terminal of the first switch 3121.

The control module 313 in the preferred embodiment of the present invention is composed of a second resistor 3131, a second switch 3132 and a third resistor 3133. One terminal of the second resistor 3131 is electrically connected with the other terminal of the first resistor 3122 and the control terminal of the first switch 3121. The first terminal of the second switch is electrically connected with the other terminal of the second resistor 3131, and the second terminal is electrically grounded. The control terminal is controlled by the PFC IC 321. One terminal of the third resistor 3133 is electrically connected with the control terminal of the second switch 3131, and the other terminal thereof is electrically grounded.

It is to be noted that the first switch 3121 and the second switch 3132 must be of opposite polarities. As illustrated in the preferred embodiment of FIG. 3, the first switch 3121 is a pnp transistor, and the second switch 3132 is an npn transistor. Likewise, if the first switch 3121 is a PMOS transistor, (not shown), then the second switch 3132 shall be an NMOS transistor (not shown).

The method for the high-voltage detecting circuit 31 to save power loss, while the power supply 30 stays at the standby mode, is depicted as follows.

While the power supply 30 is activated to stay in an operating state, the PFC IC 321 sends a high-level signal to the control terminal of the second switch 3132. Meanwhile, the second switch 3132 is conducted so that the first switch 3121 is also conducted. Thus, the high-voltage detecting module 311 can normally perform the function of detecting the high-voltage power supply. Whereas, when the power supply 30 stays at the standby mode, the PFC IC 321 is switched off so that a low-level signal is received by the control terminal of the second switch 3132. This makes the second switch 3132 shut off and the first switch 3121 fail to be conducted. Then, the high-voltage detecting module 311 formed by a plurality of serially-connected resistors is disconnected. Hence, the standby power loss of the high-voltage detecting module 311 is completely eliminated.

A clear understanding can be attainable by using actual values to carry out an estimation. Assume that the total resistance value is 1.2 MΩ for all resistors in the discharge circuit 33 and 1.5 MΩ for all resistors in the high-voltage detecting module 311, and the standby power loss of the IC in the main circuit 32 used to switch off the system is 70 mW:

(1) When the input terminal of the power supply 30 receives an 240V AC power, given the power equation relevant to resistor, $P=V^2/R$, the standby power loss of the discharge circuit 33 is:

$240^2(V)/1.2(MΩ)=48(mW)$;

the standby power loss of the high-voltage detecting circuit 31 is:

0(mW); and as such, the standby power loss of the power supply 30 is:

$48(mW)+0(mW)+70(mW)=0.118(W)$.

(2) When the input terminal of the power supply 30 receives an 100V AC power, given the power equation relevant to resistor, $P=V^2/R$, the standby power loss of the discharge circuit 33 is:

$100^2(V)/1.2(MΩ)=8.3(mW)$;

the standby power loss of the high-voltage detecting circuit 31 is:

0(mW); and as such, the standby power loss of the power supply 10 is:

$8.3(mW)+0(mW)+70(mW)=0.0783(W)$.

Figure 1:
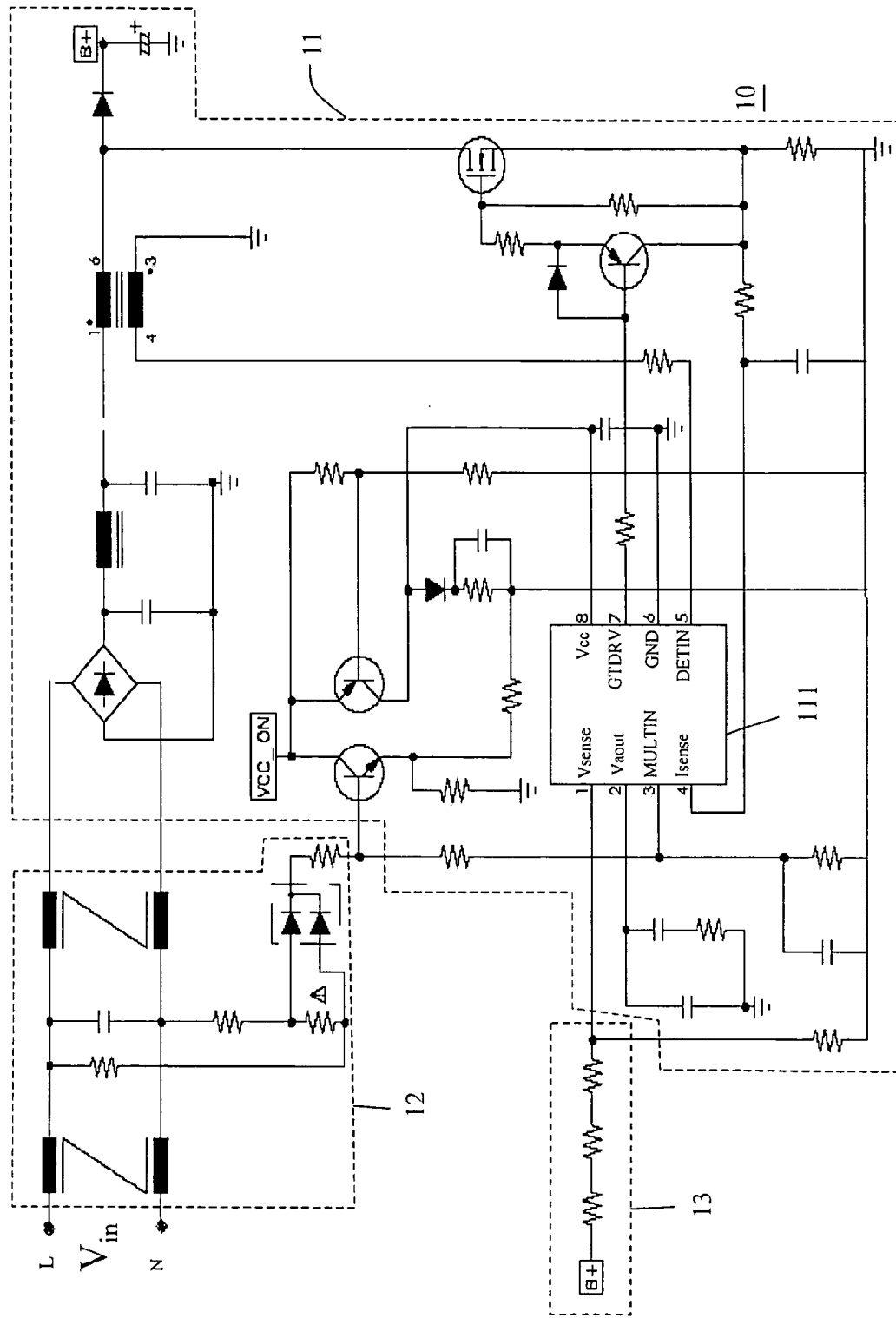
FIG. 1 is a schematic view showing a partial circuit configuration of a conventional power supply.

Currently, the standards in the commercial market demanding to lower the standby power loss of the electronic device tend to be strict. The standby power loss proposed by the present invention is far below the regulated 0.2 W (0.118 W) for input AC power of 240V and also below the regulated 0.1 W (0.0783 W) for input AC power of 100V respectively. As the aforementioned calculation result stands, the high-voltage detecting circuit brought up by the present invention improves the drawback of the power supply in FIG. 1.

Figure 2:
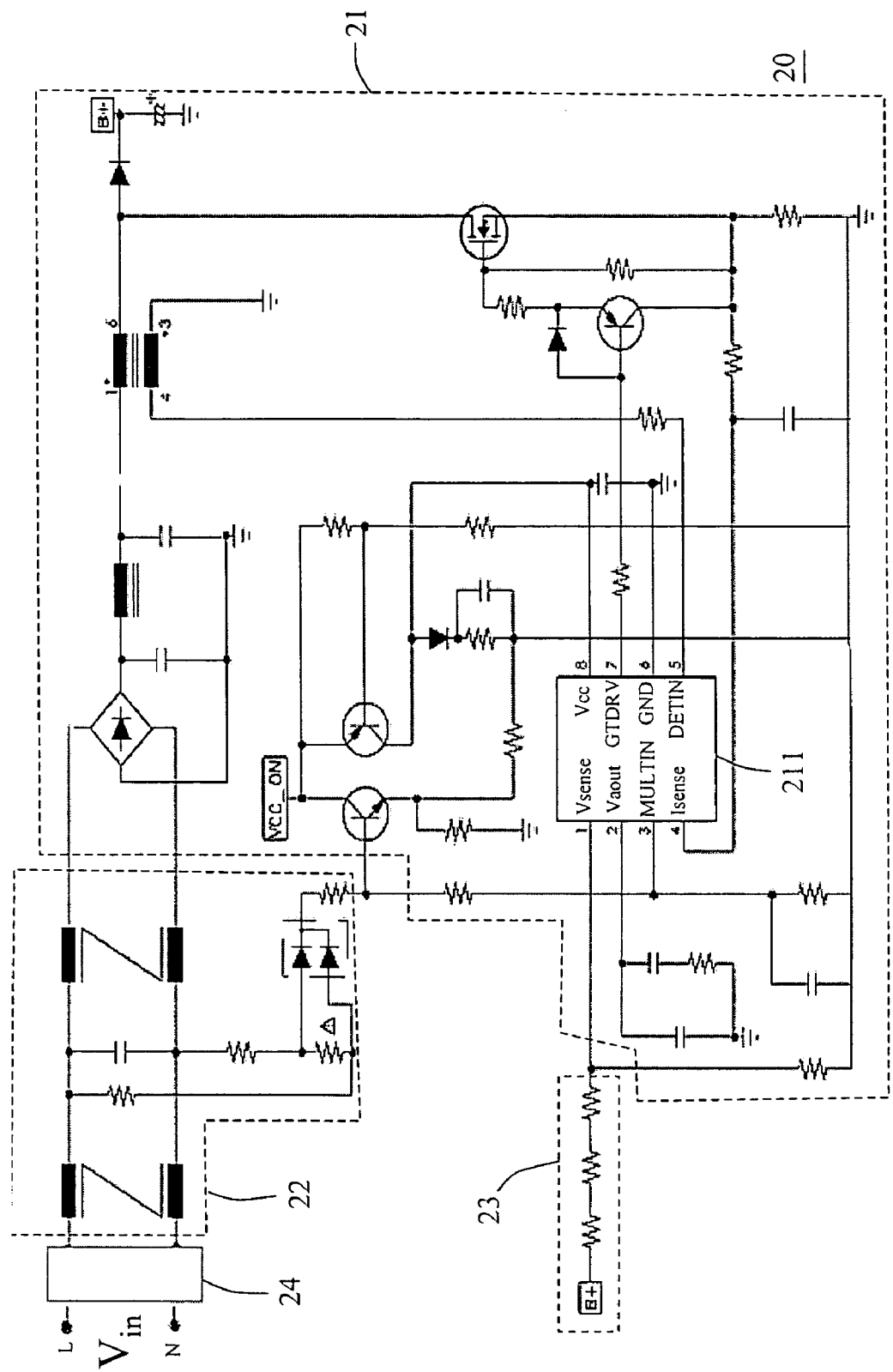
FIG. 2 is a schematic view showing a partial circuit configuration of another conventional power supply.

In addition, the high-voltage detecting circuit proposed by the present invention can also replace the improvement solution for the power supply 20 in FIG. 2. In addition to meeting the requirement for lowering the standby power loss of the electronic device as addressed in FIG. 2, the high-voltage detecting circuit of the present invention also gets rid of the issues of higher cost and poor reliability existing in the power supply 20 of FIG. 2.

(1) Based on the price level of the second quarter of Year 2004, the cost of a relay is about one US dollar. However, the total cost of the resistors and transistor switches used by the high-voltage detecting circuit of the present invention is just around one tenth of the cost of the relay. This significantly improves the cost control performance.

(2) Relay is a mechanical component. While the relay becomes aged with time, the reliability thereof may become an issue. However, in the present invention, the reliability of the resistors used by the high-voltage detecting circuit and the transistor switches fabricated in the semiconductor manufacturing process is excellent, thereby effectively enhancing the system performance.

In sum, the present invention provides a design using the semiconductor switch to control the conduction of the high-voltage detecting circuit. In contrast to the prior art, the present invention effectively eliminates the power loss of the high-voltage detecting module while the power supply stays in a standby mode. Therefore, the present invention not only has novelty and progressiveness, but also has an industry utility.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A high-voltage detecting circuit applied in a power supply, comprising:
   a high-voltage detecting module detecting a high-voltage power source and comprising a terminal;
   a switch module having a first terminal electrically connected with said high-voltage power source, a second terminal electrically connected with said terminal of said high-voltage detecting module, a control terminal, and a p-type transistor disposed between said first and said second terminals of said switch module; and
   a control module having a first terminal electrically connected with said control terminal of said switch module, a second terminal electrically grounded, and an n-type transistor controlling an on-off status of said p-type transistor, wherein:
   said n-type transistor has a first terminal, a second terminal electrically grounded, and a control terminal receiving a high/low-level signal; and
   said control terminal of said n-type transistor receives said low-level signal and said control module shuts off said switch module when said power supply is staying in a standby mode so as to eliminate both a power consumed by said high-voltage detecting module and a power consumed by said low-level signal at said standby mode.

2. The high-voltage detecting circuit of claim 1, wherein said high-voltage detecting module further comprises a plurality of resistors detecting said high-voltage power source.

3. The high-voltage detecting circuit of claim 2, wherein said plurality of resistors are connected in series.

4. The high-voltage detecting circuit of claim 1, wherein said control module further comprises a control terminal.

5. The high-voltage detecting circuit of claim 1, wherein said power supply is used to receive an alternating current, convert said alternating current into a first direct current with a relatively high voltage level and then convert said first direct current into a second direct current with a relatively low voltage level.

6. The high-voltage detecting circuit of claim 1, wherein said power supply comprises at least a power factor calibration integrated circuit (PVC IC), and said control module is controlled by said PVC IC.

7. The high-voltage detecting circuit of claim 6, wherein said p-type transistor has a first terminal electrically connected with said high-voltage power source, a second terminal electrically connected with said terminal of said high-voltage detecting module, and a control terminal, and said switch module further comprises:
   a first resistor having a first terminal electrically connected with said high-voltage power source and a second terminal electrically connected with said control terminal of said p-type transistor.

8. The high-voltage detecting circuit of claim 7, wherein said control terminal of said n-type transistor controlled by said PFC IC, and said control module further comprises:
   a second resistor having a first terminal electrically connected with said second terminal of said first resistor and said control terminal of said p-type transistor, and a second terminal electrically connected with said first terminal of said n-type transistor; and
   a third resistor having a first terminal electrically connected with said control terminal of said n-type transistor and a second terminal electrically grounded.

9. The high-voltage detecting circuit of claim 1, wherein said p-type and said n-type transistors pertain to a bi-junction transistor (BJT)

10. The high-voltage detecting circuit of claim 1, wherein said p-type and said n-type transistors pertain to a metal oxide semiconductor field effect transistor (MOSFET)

11. The high-voltage detecting circuit of claim 6, wherein said PFC IC disconnects said p-type transistor at said standby mode by shutting off said n-type transistor so as to eliminate a power consumed by said high-voltage detecting module at said standby mode.

12. A standby power-saving circuit, comprising:
   a switch module having a first terminal electrically connected with a high-voltage power source, a second terminal electrically connected with a plurality of resistors for detecting said high-voltage power source. a control terminal, and a p-type transistor disposed between said first and said second terminals of said switch module; and
   a control module having a first terminal electrically connected with said control terminal of said switch module, a second terminal electrically grounded, and an n-type transistor controlling an on-off status of said p-type transistor, wherein:

said n-type transistor has a first terminal, a second terminal electrically grounded, and a control terminal receiving a high/low-level signal; and said control terminal of said n-type transistor receives said low-level signal and said control module shuts off said switch module when said high-voltage power source is staying in a standby mode so as to eliminate both a power consumed by said plurality of resistors and a power consumed b said low-level signal at said standby mode.

13. The standby power-saving circuit of claim 12, wherein said control module further comprises a control terminal.

14. The standby power-saving circuit of claim 12, wherein said high-voltage power source is used to receive an alternating current, convert said alternating current into a first direct current with a relatively high voltage level and then convert said first direct current into a second direct current with a relatively low voltage level.

15. The standby power-saving circuit of claim 12, wherein said plurality of resistors are connected in series.

16. The standby power-saving circuit of claim 12, wherein said high-voltage power source comprises at least a power factor calibration integrated circuit (PFC IC), and said control module is controlled by said PFC IC.

17. The standby power-saving circuit of claim 16, wherein said p-type transistor has a first terminal electrically connected with said high-voltage power source, a second terminal electrically connected with said terminal of said high-voltage detecting module, and a control terminal, and said switch module further comprises:

a first resistor having a first terminal electrically connected with said high-voltage power source and a second terminal electrically connected with said control terminal of said p-type transistor.

18. The standby power-saving circuit of claim 17, wherein said control terminal of said n-type transistor controlled by said PFC IC, and said control module further comprises:

a second resistor having a first terminal electrically connected with said second terminal of said first resistor and said control terminal of said p-type transistor, and a second terminal electrically connected with said first terminal of said n-type transistor; and a third resistor having a first terminal electrically connected with said control terminal of said n-type transistor and a second terminal electrically grounded.

19. The standby power-saving circuit of claim 12, wherein said p-type and said n-type transistors pertain to a bi-junction transistor (BJT)

20. The standby power-saving circuit of claim 12, wherein said p-type and said n-type transistors pertain to a metal oxide semiconductor field effect transistor (MOSFET)

21. The standby power-saving circuit of claim 16, wherein said PFC IC disconnects said p-type transistor at said standby mode by shutting off said n-type transistor so as to eliminate a power consumed by said plurality of resistors at said standby mode.

* * * * *